Figure 1:
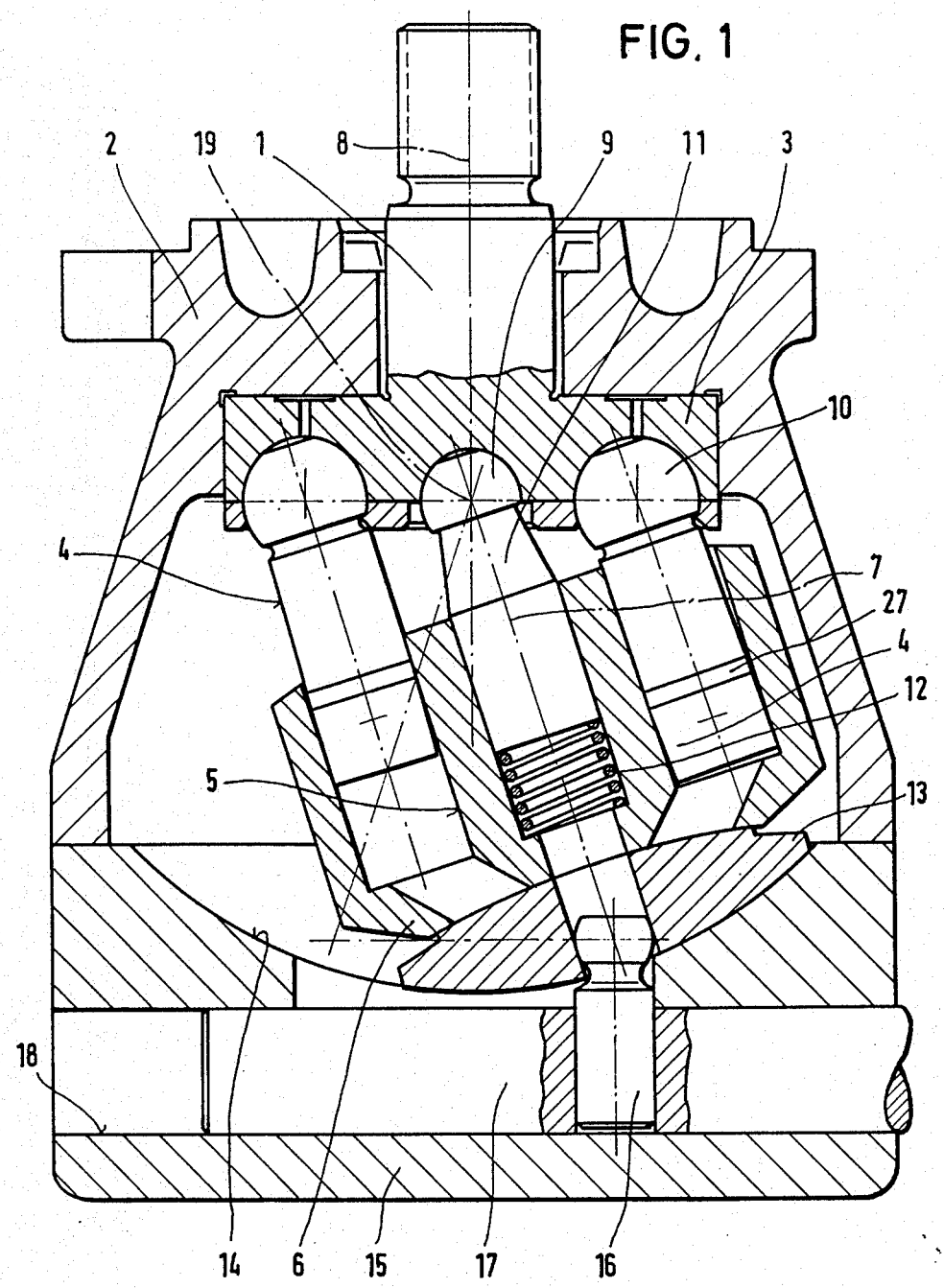

United States Patent [19]
Wagenseil

[11] 3,943,828
[45] Mar. 16, 1976

[54] ROTARY MACHINES
[75] Inventor: Ludwig Wagenseil, Vohringen, Germany
[73] Assignee: Hydromatic GmbH, Ulm (Danube), Germany
[22] Filed: Nov. 7, 1974
[21] Appl. No.: 521,761

[30] Foreign Application Priority Data
Nov. 26, 1973 Germany............... 2358870

[52] U.S. Cl. .................... 91/499; 91/505
[51] Int. Cl.² ............................ F01B 13/04
[58] Field of Search ............ 91/499, 504–506

[56] References Cited
UNITED STATES PATENTS
2,967,491   1/1961   Wiggermann ............... 91/504
FOREIGN PATENTS OR APPLICATIONS
1,949,611   10/1969   Germany ............... 91/499

Primary Examiner—William L. Freeh
Attorney, Agent, or Firm—Haseltine, Lake & Waters

[57] ABSTRACT

In a rotary machine a piston member articulated to a rotary drive member reciprocates in a piston-reciprocation chamber in a piston block mounted for rotation obliquely to the drive member. The piston member comprises a first length, whose cross-section decreases with increasing distance in opposite directions from a plane of maximum cross-section corresponding to the chamber cross-section, and an adjacent length, whose cross-section decreases with increasing distance from the first length, engaging in the chamber for torque transmission between the drive member and the block via the piston member.

7 Claims, 4 Drawing Figures

ROTARY MACHINES

This invention relates to rotary machines and is applicable to axial piston pumps and motors.

A known kind of axial piston machine comprises a rotary drive shaft, a rotary piston block which is inclined at an angle, either fixed or adjustable, to the axis of the drive shaft, and piston reciprocably arranged in corresponding open piston-reciprocation chambers in the piston block and, at ends remote from the block, articulated to a drive plate fast with the drive shaft. Transmission of torque from the drive shaft to the piston block (if the machine is working as a pump) or from the piston block to the drive shaft (if the machine is working as a motor) is effected solely by way of the pistons on account of their engagement with the piston block in the piston-reciprocation chambers. Usually, each piston is provided with an associated piston rod which is articulated within the piston and has at its free end the ball of a ball joint, this ball being received in a ball seat in the drive plate.

Entrainment of the piston block by the piston members of such a machine in cardan-less manner may be effected by providing each piston, at its side remote from the piston head, with a relatively long piston skirt at a conically opening inner side of which the piston rod bears, thereby entraining the piston block by way of the piston. Alternatively, the entrainment function of the piston rods is effected in direct contact with the walls of the piston-reciprocation chambers. As a variant of this alternative, the piston rods may entrain the piston block by means of a star-shaped entrainment member which is fast with the block (U.S. Specification No. 1,137,283).

The present invention aims at simplifying the construction of the piston members whilst allowing adequately sealed reciprocation of the members in the piston-reciprocation chambers and adequate engagement of the piston members with the piston block for the transmission of rotary drive between the drive shaft and the piston block.

With this end is view, the present invention provides a rotary machine comprising:

a rotary drive member;

a rotary piston block having portions which define an open piston-reciprocation chamber having a central chamber axis along which the chamber extends with uniform cross-sectional diameter into the block;

bearing means mounting the rotary drive member for rotation about a first axis, fixed relative to the bearing means;

mounting means mounting the rotary piston block for rotation about a second axis which is oblique to the said first axis and is spaced from the said central chamber axis;

and a piston member having an end portion articulated to the said rotary drive member at a location spaced from the said first axis and having a main portion received in the said piston-reciprocation chamber for reciprocation therein, the said main portion comprising:

a first piston length, having a cross-sectional plane at which it has a maximum cross-sectional diameter corresponding to the said uniform cross-sectional diameter, for sliding sealingly in the said piston-reciprocation chamber, the said first piston length decreasing in cross-sectional diameter with increasing distance in opposite directions from the said cross-sectional plane, and a second piston length, located to one end of the said first piston length, of cross-sectional diameter decreasing with increasing distance from the said first piston length, for engaging with the rotary piston block in the said piston-reciprocation chamber to transmit rotary drive between the said drive member and the block.

It will be appreciated that in a rotary machine embodying the present invention the mounting means for the piston block may be adapted to permit adjustment of the inclination between the first, drive-member axis and the second, piston-block axis. Alternatively, however, these axes may be fixed relative to one another.

It will be further appreciated that, generally, a rotary machine embodying the invention will have a whole set of piston members such as described above, in which case a whole set of corresponding piston-reciprocation members is provided in the piston block of the machine.

In addition to a second piston length such as referred to above, the main portion of the or each piston member of a rotary machine embodying the present invention may also comprise a third piston length which is located to that end of the first piston length remote from the second piston length and which, like the latter, is of decreasing cross-sectional diameter with increasing distance from the first piston length, this third piston length serving the same purpose as the second piston length. Moreover, the main portion of a piston member of a rotary machine embodying the invention may be formed with a radial constriction between the first and second piston lengths. Alternatively or additionally, the main portion of the piston member may, if this main portion includes a third piston length, be formed with such a constriction between the first and third piston lengths. However, it is also possible for the first and second piston lengths and/or the first and third piston lengths to merge with one another without discontinuity. Advantageously, the first piston length is of part-spherical shape while the second piston length and, if present, the third piston length are of frusto-conical shape.

Advantageously as regards sealing of a piston member in its associated piston-reciprocation chamber, there is formed in the main portion of the piston member a circumferentially extending groove in which a piston ring is received. This groove may run around the main portion of the piston member in the region of its above-mentioned first piston length, or it may be formed between this first piston length and the above-mentioned second piston length. Moreover, if the main portion of the piston member includes a third piston length such as mentioned above, such a groove may, alternatively or additionally, be formed between the first and third piston lengths. Preferably, the piston ring associated with the or each such groove has a radially outer circumferential surface of part-spherical shape for bearing against the wall of the relevant piston-reciprocation chamber. Preferably, too, the associated piston ring is accommodated in its groove with radial play or clearance.

U.S. Specification No. 2,956,845 proposes an axial piston machine, having a shaft rotating with the piston block and a piston guiding plane inclined relative to the shaft axis (swash-plate machine), in which a piston packing is formed with a split piston ring whose sliding surface is of spherical shape and has a diameter corresponding to the diameter of the relevant piston-reciprocation chamber. In one constructional form of this machine, the pistons thereof, which with the associated piston rods perform angular movements relative to the rotary axis of the piston block during operation, are fast with the piston rods, i.e. each piston and its associated piston rod are formed as a single piston member. In this arrangement, the external surface of each piston is part-spherical and has a radius and a centre of curvature corresponding with those of the sliding surface of the associated piston ring. The piston members are designed in this fashion solely for the purpose of achieving a good sealing effect. The transmission of rotary drive is neither provided by the piston members nor is it possible, since the part-spherical shape of each piston is expressely adapted to the shape and position of the sliding surface of the associated piston ring or rings and is also intended to enhance the sealing effect for leakage oil if, on account of angular movements performed by the piston, relatively large guiding forces should be set up between the piston and the wall of an associated piston-reciprocation chamber.

In contrast, in a suitably constructed form of rotary machine embodying the invention, the piston members allow both the necessary sealing and the transmission of rotary drive between the drive member and the piston block by way of the piston members to be achieved.

Figure 2:
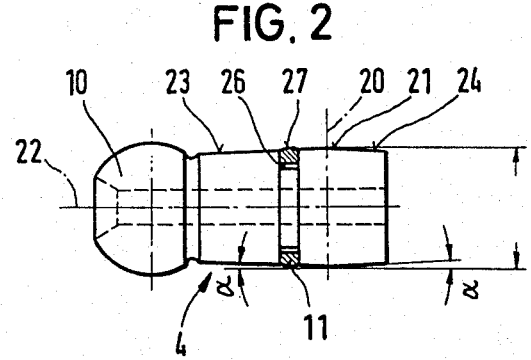
Figure 3:
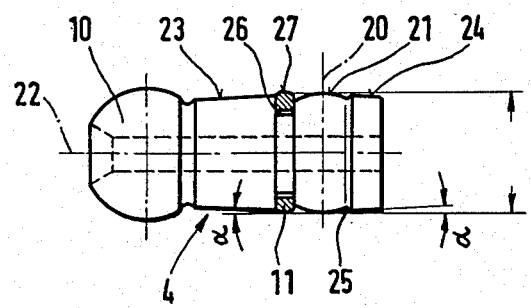
Figure 4:
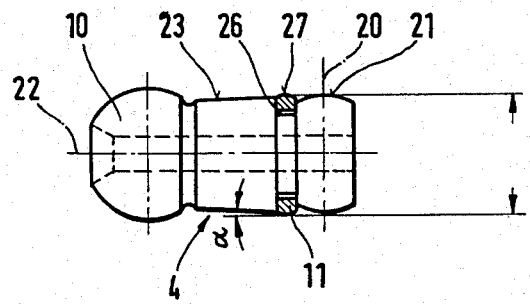

For a better understanding of the invention, and to show how it may be carried into effect, reference will now be made, by way of example, to the accompanying drawings, in which:

FIG. 1 is a diagrammatic sectional view of a rotary machine embodying the invention, and FIGS. 2 to 4 are respective views, partially in section, of three forms of piston member for such a machine.

The illustrated rotary machine is an axial piston machine having a drive shaft 1 mounted in shaft bearing means of a machine housing 2. The shaft 1 carries a drive plate 3 in one piece therewith. By means of respective end portions in the form of ball-joint balls 10, piston members 4 are articulated to the drive plate 3 for universal-joint movement relative thereto. The main portions of the piston members 4 are received for reciprocation in respective open piston-reciprocation chambers provided by cylindrical bores 5 extending in parallel through one face of a rotary piston block 6. The piston members 4 engage with the piston block 6 in such manner that rotary drive is transmitted between the drive plate 3 and the block 6 by way of the piston members. The magnitude of the stroke of the piston members 4 in the bores 5 when the machine is in operation depends on the degree of obliquity between the rotary axis 8 of the shaft 1 and the rotary axis 7 of the piston block 6. The piston block 6 is mounted in the machine by means of a central journal 11 articulated to the drive plate 3 by a ball-joint 9 and bears - in the loaded condition of the machine, under the action of the hydraulic forces and, in the unloaded condition of the machine, only under the force of a compression spring 12 arranged between the journal 11 and the piston block 6 - on a complementary control member 13 bearing on a cylindrical guide face 14 defined by a housing part 15 of the machine.

For varying the inclination of the rotary axis 7 of the piston block 6 relative to the rotary axis 8 of the shaft 1 and, therewith, for varying the magnitude of the stroke performed by the piston members 4 in the cylinder bores 5, there engages in the complementary control member 13 an adjusting pin 16 which is fast with an adjusting rod 17 mounted for displacement in the machine housing part 15 in a bore 18. Coupled with the adjusting rod 17 is an adjusting mechanism (not shown) whereby the adjusting rod 17 can be displaced in the longitudinal direction, so that the pin 16 displaces the control member 13 along the cylindrical guide face 14, accompanied by pivoting of the piston block 6 about a pivot axis 19 passing through the centre of the ball-joint 9 perpendicularly to the plane of FIG. 1. Formed in the control member 13 are inflow and outflow bores (control ports - not shown in FIG. 1) which selectively connect the cylinder bores 5, in dependence upon the pivot position of the piston block 6, with inflow and outflow connections (also not shown) in the housing part 15.

The piston members 4 may take any of the forms illustrated in FIGS. 2 to 4. In each case the illustrated form of piston member comprises an end portion in the form of a ball-joint ball 10 that is integral with a main portion which includes a first piston length 21 of part-spherical shape symmetrically arranged so that the cross-sectional diameter of the piston length 21 decreases with increasing distance from a plane 20 of maximum cross-sectional diameter corresponding to the diameter of the cylinder bores 5, the centre of curvature of the part-spherical surface of the piston length 21 coinciding with the point of intersection of the plane 20 and a central longitudinal axis 22 of the piston member.

Located to each end of the piston length 21 in the case of FIGS. 2 and 3 but only to one end of the piston length 21 in the case of FIG. 4 is an adjacent piston length 23 or 24 of frusto-conical shape. The piston lengths 23 24 are arranged so as to be of decreasing cross-sectional diameter with increasing distance from the piston length 21. In the case of FIG. 1, the piston length 21 of part-spherical shape merges with each of the piston lengths 23 and 24 without discontinuity, i.e. the surfaces of the piston lengths 23 and 24 meet the surface of the piston length 21 tangentially. In the case of FIGS. 3 and 4, the main portion of the piston member is formed with a radial constriction (such as the constriction 25 in FIG. 3) located between the piston length 21 and the piston length 23. In the case of FIG. 3, such a constriction (the constriction 25) is also formed between the piston length 21 and the piston length 24. Such constrictions may be expedient inter alia for manufacturing reasons. Formed in the region of the piston length 21 or between the piston length 21 and at least one of the piston lengths 23 and 24 is a circumferentially-extending groove 26 for receiving a piston ring 27. The piston ring 27 is guided with radial play or clearance in the groove 26. It may be designed as a one-piece ring or a split ring which is elastic or is under the working pressure of the machine. The radially outer surface thereof intended to bear against the wall of the corresponding cylinder bore 5 is of part-spherical shape.

The piston length 23 or 24 of a piston member such as illustrated in FIGS. 2, 3 or 4 engages with the wall of a corresponding cylinder bore 5 so as to allow the transmission of rotary drive between the drive plate 3 and the piston block 6 by way of such a piston member, the piston length 21 of such a piston member serving, with the aid of the piston ring 27 received in the groove 26, to ensure sealed sliding of the piston member in the bore.

What is claimed is:

1. A rotary machine comprising:
   a rotary drive member;
   a rotary piston block having portions which define an open piston-reciprocation chamber having a central chamber axis along which the chamber extends with the uniform cross-sectional diameter into the block;
   bearing means mounting the rotary drive member for rotation about a first axis, fixed relative to the bearing means;
   mounting means mounting the rotary piston block for rotation about a second axis which is oblique to the said first axis and is spaced from the said central chamber axis;
   and a piston member having an end portion articulated to the said rotary drive member at a location spaced from the said first axis and having a main portion received in the said piston-reciprocation chamber for reciprocation therein, the said main portion comprising:
      a first piston length of part-spherical shape for sliding exclusively sealingly in the said piston-reciprocation chamber, so as to form an articulatedly movable sealing location, said part-spherical shape having a cross-sectional plane at which it has a maximum cross-sectional diameter corresponding to the said uniform cross-sectional diameter, the said first piston length decreasing in cross-sectional diameter with increasing distance in opposite directions from the said cross-sectional plane,
      and a second piston length of frusto-conical shape being located to one end of the said first piston length and having a cross-sectional diameter decreasing with increasing distance from the said first piston length, for engaging with the said rotary piston block in the said piston-reciprocation chamber to transmit rotary drive between the said drive member and the block.

2. A rotary machine as claimed in claim 1, wherein said first and second piston lengths merge with one another without discontinuity.

3. A rotary machine as claimed in claim 1, wherein the said main portion is formed with a radial constriction between said first and second piston lengths.

4. A rotary machine as claimed in claim 1, wherein the said main portion is formed with a circumferentially-extending groove between the said first and second piston lengths, and a piston ring is received in the groove, said piston ring having a radially-outer circumferentially-extending surface of part-spherical shape and being accommodated in said groove with radial clearance.

5. A rotary machine as claimed in claim 1, wherein the said main portion further comprises a third piston length of a frusto-conical shape located to that end of the said first piston length which is remote from the said second piston length, of cross-sectional diameter decreasing with increasing distance from the said first piston length, for engaging with the said rotary piston block in the said piston-reciprocation chamber to transmit rotary drive between the said rotary drive member and the block.

6. A rotary machine as claimed in claim 5, wherein the said first and third piston lengths merge with one another without discontinuity.

7. A rotary machine as claimed in claim 5, wherein the said main portion is formed with a radial constriction between the said first and third piston lengths.

* * * * *